United States Patent [19]
Murphy et al.

[11] Patent Number: 5,613,414
[45] Date of Patent: Mar. 25, 1997

[54] SYSTEM FOR CUTTING A STRIP OF ELASTOMERIC MATERIAL SUCH AS A TIRE TREAD

[75] Inventors: Stephen B. Murphy, Medina; Debbie J. Mathie, Canton, both of Ohio

[73] Assignee: The Goodyear Tire & Rubber Company, Akron, Ohio

[21] Appl. No.: 330,728

[22] Filed: Oct. 28, 1994

[51] Int. Cl.⁶ .................................................. B26D 7/10
[52] U.S. Cl. ................................ 83/16; 83/56; 83/171; 83/951; 83/76; 83/922
[58] Field of Search .................................. 83/16, 171, 56, 83/951, 18, 20, 21, 74, 75.5, 76, 175, 176, 922, 639.1, 639.7, 578

[56] References Cited

U.S. PATENT DOCUMENTS

| | | | |
|---|---|---|---|
| 1,353,769 | 9/1920 | Macbeth et al. | 83/56 |
| 2,261,837 | 11/1941 | Allen | 83/578 X |
| 2,539,240 | 1/1951 | Firestone | 83/176 X |
| 3,354,765 | 11/1967 | Frey et al. | 83/76 |
| 3,557,650 | 1/1971 | Cantarutti | 83/171 X |
| 3,641,855 | 2/1972 | Balle | 83/171 |
| 3,732,767 | 5/1973 | Habert | 83/171 |
| 3,762,259 | 10/1973 | Kuts | 83/578 X |
| 3,789,712 | 2/1974 | Enders | 83/171 |
| 3,964,360 | 6/1976 | Schwartz | 83/464 |
| 3,973,459 | 8/1976 | Stowe | 83/455 |
| 4,279,183 | 7/1981 | LaFleur | 83/175 X |
| 4,334,448 | 6/1982 | Messerschmitt | 83/171 |
| 4,516,451 | 5/1985 | Takeshita et al. | 83/171 |
| 4,608,890 | 9/1986 | Still et al. | 83/56 X |
| 5,029,502 | 7/1991 | Irie | 83/578 X |
| 5,465,639 | 11/1995 | Senbokuya | 83/56 X |

*Primary Examiner*—Rinaldi I. Rada
*Assistant Examiner*—Boyer Ashley
*Attorney, Agent, or Firm*—Frederick K. Lacher

[57] ABSTRACT

An electrically heated knife blade is mounted on a carriage for moving the blade across a strip of elastomeric material. The carriage is propelled by a constant force provided by a pneumatic cylinder in communication with a source of constant air pressure so that the cutting speed is automatically increased at sections of strip material which are relatively thin and the cutting speed is automatically decreased at sections of strip material which are relatively thick. Sensors for determining the position of the relatively thick sections may be connected to the source of electricity for heating the knife blade to increase the voltage while cutting the relatively thick sections and thereby provide for a substantially constant cutting speed across the strip of elastomeric material. A tire tread is bent at the location the knife blade is moved across the tread to provide matching cut ends for splicing on a tire building drum.

3 Claims, 4 Drawing Sheets

SYSTEM FOR CUTTING A STRIP OF ELASTOMERIC MATERIAL SUCH AS A TIRE TREAD

BACKGROUND OF THE INVENTION

1. Field of Invention

This invention relates to the art of methods and apparatus for cutting elastomeric materials and especially for cutting tire components such as tire treads.

2. Description of the Related Art

In cutting an elastomeric material such as rubber with a heated knife it is important that the temperature at the heated knife blade be high enough to provide the maximum cutting speed through the material but at the same time the temperature be controlled so that the material is not cured or damaged by high temperatures during cutting. This has been a problem when cutting elastomeric material such as rubber treads of variable thickness where the heated knife is moved across the tread at a constant speed. Where the speed has been fast enough while the knife is traversing the sections of lessor thickness it has been too fast while the knife is traversing the sections of greater thickness. Accordingly the heat generated by the knife in the section of greater thickness has caused the temperature to increase to undesirable high temperatures which has caused premature curing or damage of the material.

Prior art cutters for high mass, large cross-section components of rubber material have also included conduction-heated guillotine blades to plunge cut through the rubber material. There have been problems with this type of cutter because it utilizes a wedge-shaped blade which distorts the cut surface by compressing the trailing edge and elongating the leading edge. Splice control has been difficult which adversely affects tire uniformity. This prior art system is timer driven and the cut edges are exposed to the hot knife blade as it continues to plunge through the material. In addition the hot knife is positioned above the rubber material which has caused surface blooming. By surface blooming is meant surfacing of oils due to heat. Problems have also been experienced with incomplete cutting and rebound causing the leading and trailing cut edges to adhere after being cut. Control of the blade temperature has been difficult and slow because of the large thermally conductive mass. The time required for replacement of the blades has also been substantial because the larger mass involved requires considerable time for cooling.

SUMMARY OF THE INVENTION

With the cutting system embodying the invention the heated blade is carried on a carriage which is moved across the strip of elastomeric material at a speed dependant on the thickness of the material. This is accomplished by using a pneumatic rodless cylinder wherein the pressure in the cylinder is maintained at a substantially constant level. Accordingly as the heated knife which is carried by the knife carriage is moved through the elastomeric material, the speed at which it moves will be self-regulated by the resistance of the material to movement of the knife. If a section of the material such as a center section of a tire tread is relatively thick, the cutting speed or speed of traverse will be reduced and the rise in temperature at the cut will be limited. Likewise if a section of the material such as a sidewall portion of a tire tread is relatively thin the cutting speed will be increased and the drop in temperature at the cut will be limited. In this way a substantially constant temperature at the cut will be maintained.

In accordance with one aspect of the invention there is provided an apparatus for cutting a body of elastomeric material comprising an electrically heated knife blade heated by the flow of low voltage current through high resistance blade material the knife blade being mounted on a carriage moving mechanism for traversing the heated knife blade through the body and a carriage moving mechanism for providing a predetermined constant pressure of the electrically heated knife blade against the body so that the cutting speed of the carriage can vary in response to changes in thickness of the body and changes in the blade temperature due to the changes in thickness.

In accordance with another aspect of the invention there is provided a method of cutting a body of elastomeric material comprising electrically heating a knife blade by the flow of low voltage current through high resistance blade material, traversing the heated knife blade on a carriage through the body, moving the carriage to provide a predetermined constant pressure of the heated knife blade against the body so that the cutting speed of the knife blade can vary in response to changes in the thickness of the body and changes in blade temperature caused by the changes in thickness.

Other benefits and advantages of the invention will become apparent to those skilled in the art to which it pertains upon a reading and understanding of the following detailed specification.

BRIEF DESCRIPTION OF THE DRAWINGS

The invention may take physical form in certain parts and certain arrangement of parts, a preferred embodiment of which will be described in detail in the specification and illustrated in the accompanying drawings, which form a part hereof and wherein.

DESCRIPTION OF THE PREFERRED EMBODIMENT

Figure 1:
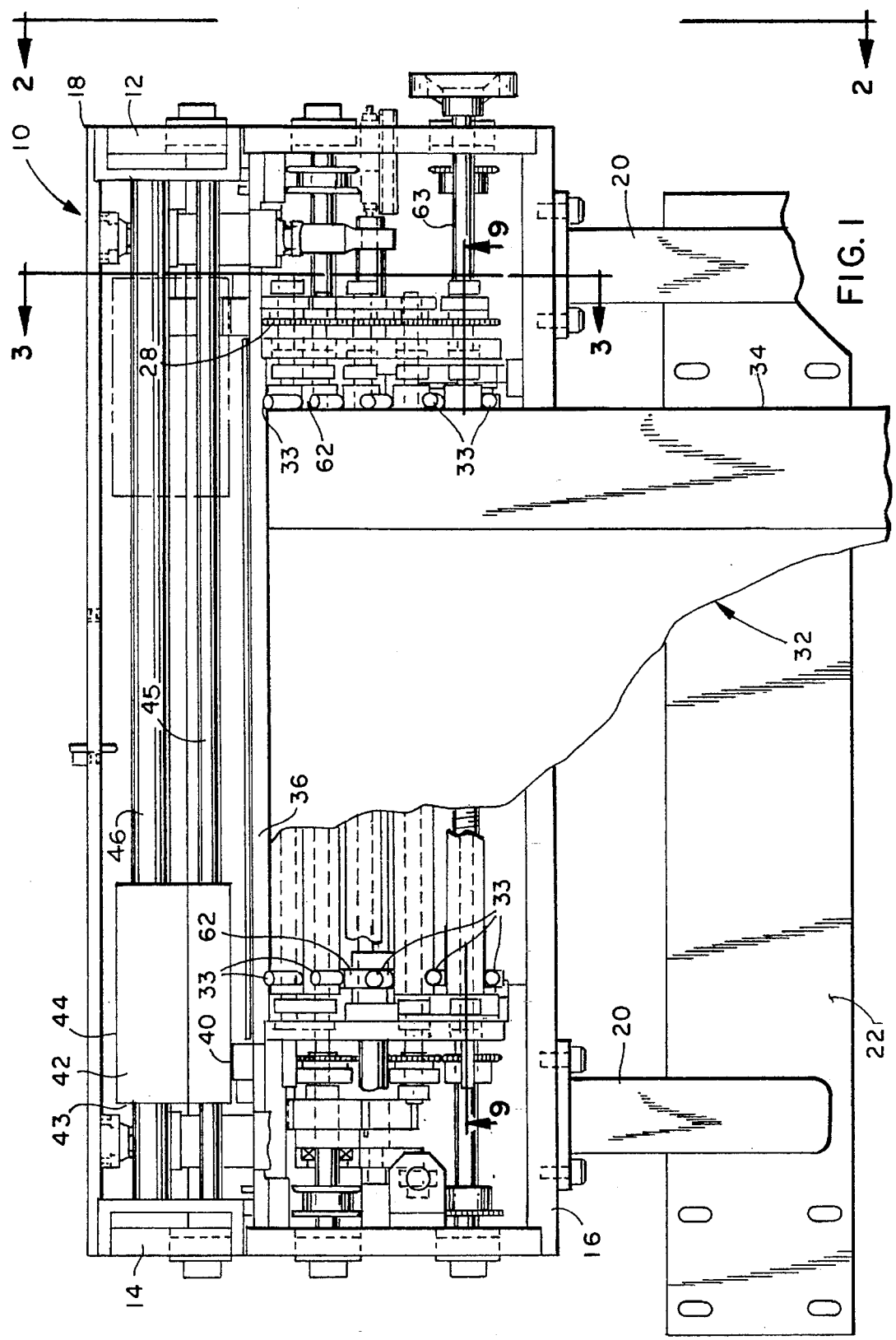
FIG. 1 is a rear elevation of a cutting assembly embodying the invention with parts being broken away.
Figure 2:
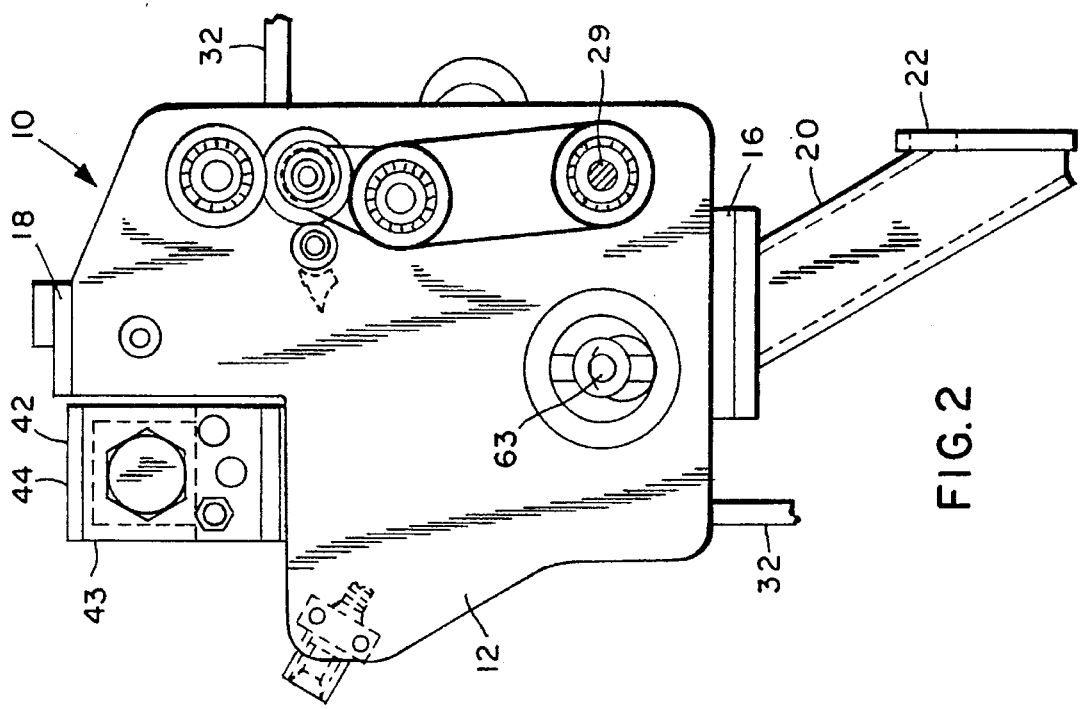
FIG. 2 is an end view taken along the plane of line 2—2 in FIG. 1.
Figure 3:
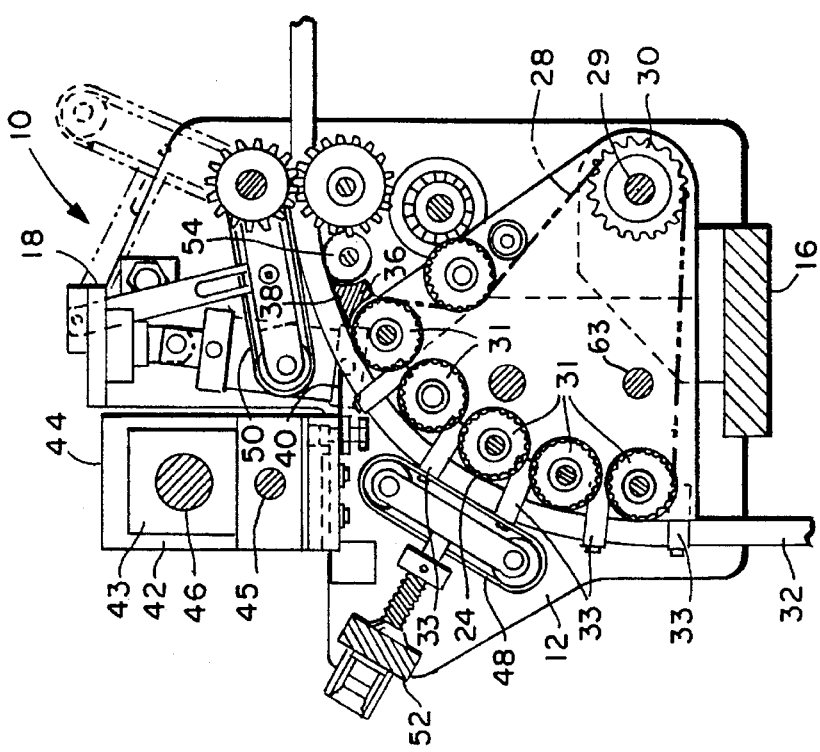
FIG. 3 is a sectional view taken along the plane of line 3—3 in FIG. 1.
Figure 4:
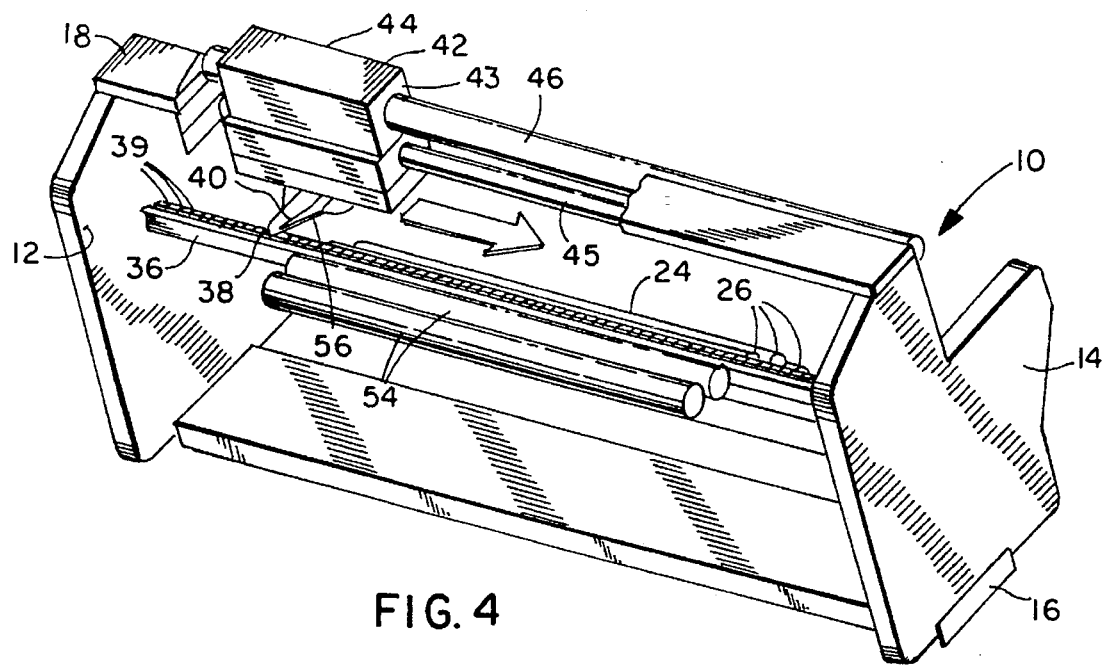
FIG. 4 is a diagrammatic view in perspective from the front of the cutting assembly shown in FIGS. 1, 2 and 3.

Referring to FIGS. 1, 2 and 3, a cutting assembly 10 embodying the invention is shown having end plates 12 and 14 connected by a base plate 16 and top plate 18. The assembly 10 may be supported on another structure by bracket 20 fastened to the base plate 16 and welded to a support plate 22.

A conveyor 24 having driven rollers 26 is mounted on the cutting assembly 10 between the end plates 14. A chain 28 driven by shaft 29 engages sprocket 30 on the shaft 29 and sprockets 31 on the driven rollers 26 for driving the rollers when the shaft is turned. The conveyor 24 supports a body of elastomeric material in the form of an elongated strip such as a tire tread 32.

Edge members such as fence rods 33 are mounted on axially adjustable fence supports on each side of the conveyor 24 and are moveable to positions in engagement with edges 34 of the tire tread 32.

As shown in FIGS. 3, 4, 5 and 6 an anvil 36 is positioned adjacent one of the rollers 26 and is mounted on the end plates 14. The anvil 36 has a longitudinal groove 38 for receiving a knife blade 40 to cut the tread 32. Transverse machined grooves 39 in the anvil prevent slippage of the material being cut due to side forces. The knife blade 40 is mounted on a knife carriage 42 slidably supported by support rods 45 and 46. The knife carriage 42 is moved across the cutting assembly 10 and through the tire tread 32 by a carriage moving mechanism 43 which provides a constant pressure of the knife blade 40 against the tire tread 32. In this embodiment a pneumatic rodless cylinder 44 is utilized in which a constant air pressure is provided to move the knife carriage 42 across the cutting assembly 10. The air pressure is preferably about 20 to 40 psi which may be the pressure communicated from a source of factory air.

A first hold down belt and roller unit 48 may be mounted on a lower support bar 52 for engagement with the tread 32 on the conveyor 24. A second belt and roller unit 50 may be mounted on the top plate 18 to direct the tread 32 around the curved section of conveyor 24. Take away rollers 54 may be positioned on the other side of the anvil 36 from the driven rollers 26.

Figure 7:
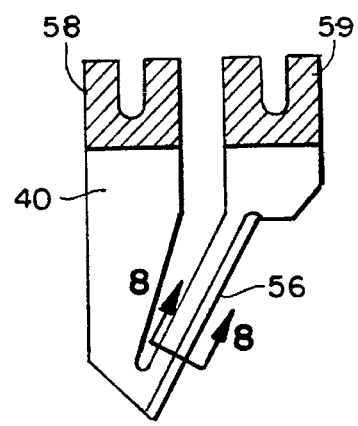
FIG. 7 is an enlarged plan view of the electrical resistance heated cutting blade shown in FIGS. 4, 5 and 6.
Figure 11:
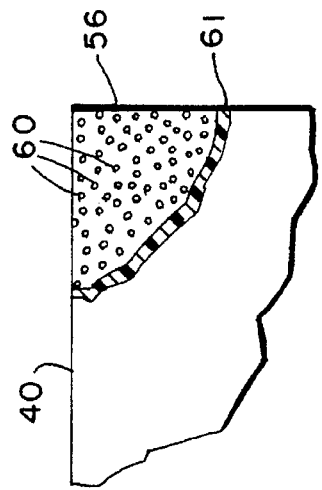
FIG. 11 is a fragmentary view taken along line 11 in FIG. 10 with the surface broken away to show the coating configuration.
Figure 10:
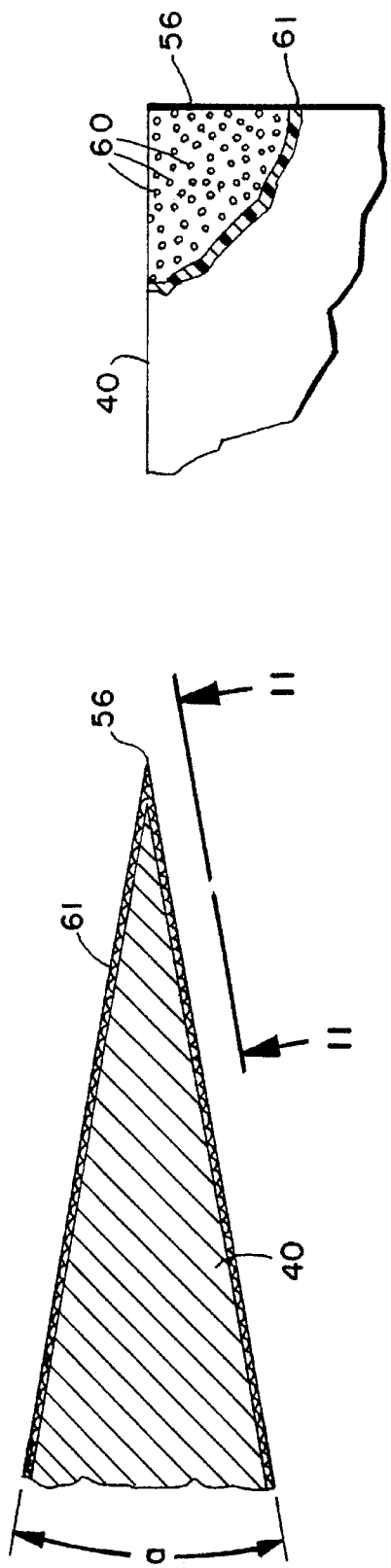
FIG. 10 is an enlarged fragmentary sectional view of the cutting blade like FIG. 8 showing the surface treatment of the blade.

Referring to FIGS. 7, 8, 10 and 11 the knife blade 40 is shown in greater detail. As shown in FIG. 7 the knife blade 40 is in a generally "U-shape" with a knife edge 56 on one leg of the blade. The knife blade 40 is heated by the flow of low voltage electrical current passing through the blade and therefore the knife blade has two terminals 58 and 59 at the ends of the legs of the "U-shaped" blade. Preferably the knife edge 56 is hollow ground at an angle "a" of about 30 degrees. As shown in FIGS. 10 and 11 the knife edge 56 is sprayed with a ceramic material 60 such as aluminum oxide and then coated with a non-reactive abrasion resistant coating 61.

Figure 9:
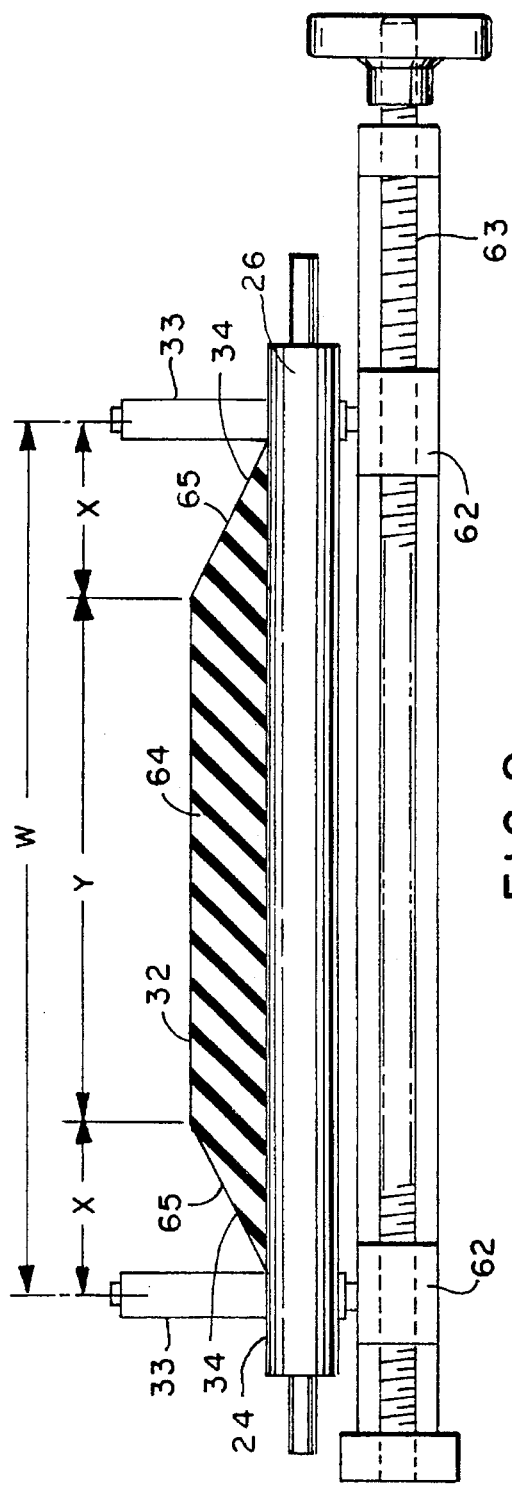
FIG. 9 is a cross-section of the conveyor and fence guide taken along the plane of line 9—9 in FIG. 5

Referring to FIG. 9 the fence rods 33 are shown in greater detail mounted on adjustable rings 62 threaded on screw 63 for moving the fence rods 33 located between the driven rollers 26 to positions along the edges 34 of the tire tread 32. Sensors (not shown) may be connected to the fence rods 33 to determine the width W of a tire component such as a tread 32. Then the width X of thin edge sections 65 and width Y of thick center section 64 of the tread 32 may be entered in the controls of the assembly 10 to automatically boost the electrical current during the cut of the thick center section to compensate for heat lost during conduction if a faster cutting speed is required.

In operation a tire component such as tire tread 32 having thick center section 64 and thin edge sections 65 is fed through the cutting assembly 10 over driven rollers 26 and takeaway rollers 54. The tread 32 is held down by first hold down belt and roller unit 48. Fence rods 33 are adjusted to engage the edges 34 of the tread 32 for guiding it through the cutting assembly 10.

The knife blade 40 is heated to a predetermined temperature of about 500° F. (260° C.) by electrically heating a flow of low voltage (3–10 volts) current through the blade 40 to heat the blade through an open loop system so that the temperature may be automatically increased in cutting the thick center section 64 of the tread 30.

When the tread 32 is positioned for cutting the knife carriage 42 it is moved across the cutting assembly 10 by communicating air under constant pressure from about 20 to 40 pounds per square inch (1.41 to 2.82 kilograms per square centimeter) to the pneumatic rodless cylinder 44. The knife carriage 42 is moved across the cutting assembly 10 on support rods 45 and 46 in the direction shown by an arrow in FIG. 4. As the heated blade 40 traverses the tread 32 the thin edge section 65 at the left side as seen in FIG. 9 is cut first. Because it is relatively thin the resistance to movement of the blade 40 through the material is less than the resistance to movement through the thick center section 64. Accordingly the knife blade 40 will be pushed through the material of the tread 32 automatically at an initial cutting speed which is greater than the cutting speed the knife blade 40 is pushed through the thick center section 64. Then when the knife blade 40 enters the other thin edge section 65 the resistance to movement of the blade will be reduced and the final cutting speed of the knife blade will be increased. By increasing the cutting speed through the thin edge sections 62 the temperature of the material being cut is held to a minimum and there is no premature curing of the cut edges. Likewise, when the knife blade 40 is pushed through the thick center section 64 the heat is conducted away from the knife blade causing the cutting speed of the blade to be reduced. This reduction in cutting speed results in a build up of the temperature of the blade 40. As the temperature of the blade 40 increases the cutting resistance of the material of the tread 32 decreases and the pressure from the rodless cylinder 44 moves the knife blade 40 through the tread at an increased cutting speed.

With reference to FIG. 9 it may be desirable to cut the thick center section 64 with a blade 40 at a higher temperature than the automatic increase in temperature. This can be accomplished by setting the controls for supplying electrical current to boost the electrical current during the cutting of the thick center section 64 and reducing the current during the cutting of the thin edge sections 62. With the constant pressure of the knife blade 40 against the material of the tread 32 the knife carriage 42 will be moved at substantially the same cutting speed through the tread.

As the knife blade 40 is moved through the tire tread 32 or any other elastomeric body of variable thickness the constant pressure applied by the blade will automatically control the cutting speed of movement through the material. For example, if the thickness of the section of material to be cut is increased the resistance to movement will increase and the temperature at the incision will increase. The cutting speed of the knife blade 40 will be reduced and the increase in temperature at the incision will be limited so that precuring or other damage to the cut surfaces will be avoided.

Figure 5:
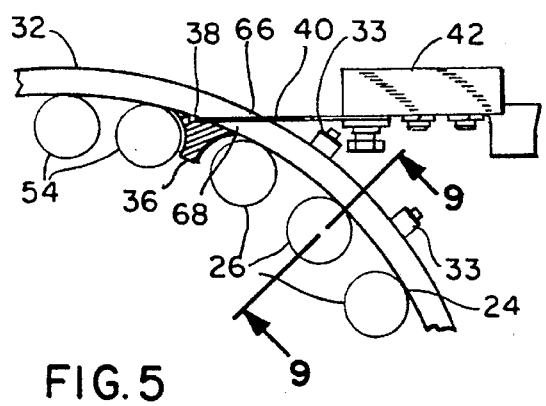
FIG. 5 and 6 are enlarged diagrammatic fragmentary sectional views of the cutter and anvil shown in FIG. 4 showing the sheet of elastomeric material during and after cutting.
Figure 6:
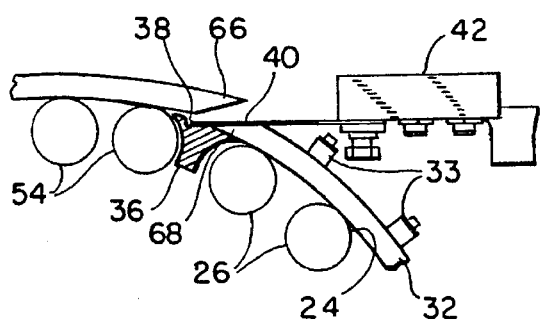
Figure 8:
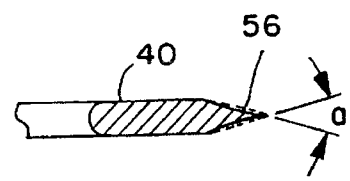
FIG. 8 is a fragmentary sectional view of the cutting blade taken along the plane of line 8—8 in FIG. 7.

Referring to FIGS. 5 and 6 the tread 32 is shown as it is positioned on the conveyor 24. The tread 32 which is flat in its extruded form is bent by the conveyor 24. Then when the knife blade 40 is moved across the tread 32 the resulting tread ends 66 and 68 spring apart preventing rebound and adherence of the ends after the tread is cut. Bending of the tread 32 at the anvil 36 also provides cut surfaces on the tread ends 66 and 68 which match when the tread is wrapped around a tire building drum (not shown) where the tread is also bent in a similar manner. Therefore the cut surface at the trailing and leading ends 66 and 68 of the tread 32 will match for splicing on the drum. This provides a superior high quality splice of the tread 32 on the tire building drum.

The knife blade 40 of this cutting assembly 10 is only in contact with the tread 32 long enough for the heat and pressure to slide the knife blade through the material. The hot heat-radiating knife blade 40 is positioned a substantial distance from the tread 32 when not cutting. The open loop electrical system of this invention provides for directly allowing low voltage current to flow through the high resistance material of the knife blade 40. This automatically provides temperature control of the blade 40. Because the knife blade 40 has a low profile it is possible to obtain fast temperature response for increasing or decreasing temperature. This also provides quick cooling for fast replacement of the knife blade 40.

The present invention has been described with reference to a preferred embodiment. Obviously, modifications and alterations will occur to others upon a reading and understanding of this specification. It is intended by the applicants to include all such modifications and alterations insofar as they come within the scope of the appended claims or the equivalents thereof.

Having thus described the invention,
It is claimed:

1. A method of cutting a body of elastomeric material having two thicknesses comprising:
    a) electrically heating a knife blade
    b) traversing said heated knife blade through said body;
    c) applying predetermined constant pressure of said heated knife blade against said body;
    d) increasing the temperature of said heated knife at the positions where the thickness is increased; and
    e) decreasing the temperature of said heated knife at the positions where the thickness is decreased.

2. The method of claim 1 including the step of bending said body at the location said knife blade is moved through said body to separate cut ends of said body as said body is being cut and improve the splice quality.

3. The method of claim 1 wherein said constant pressure of said heated knife blade against said body and variation in the speed of said knife blade when said knife blade is traversed through said body is provided by applying pressure from a rodless cylinder assembly connected to said heated knife and in communication with a source of air pressure.

* * * * *